United States Patent Office.

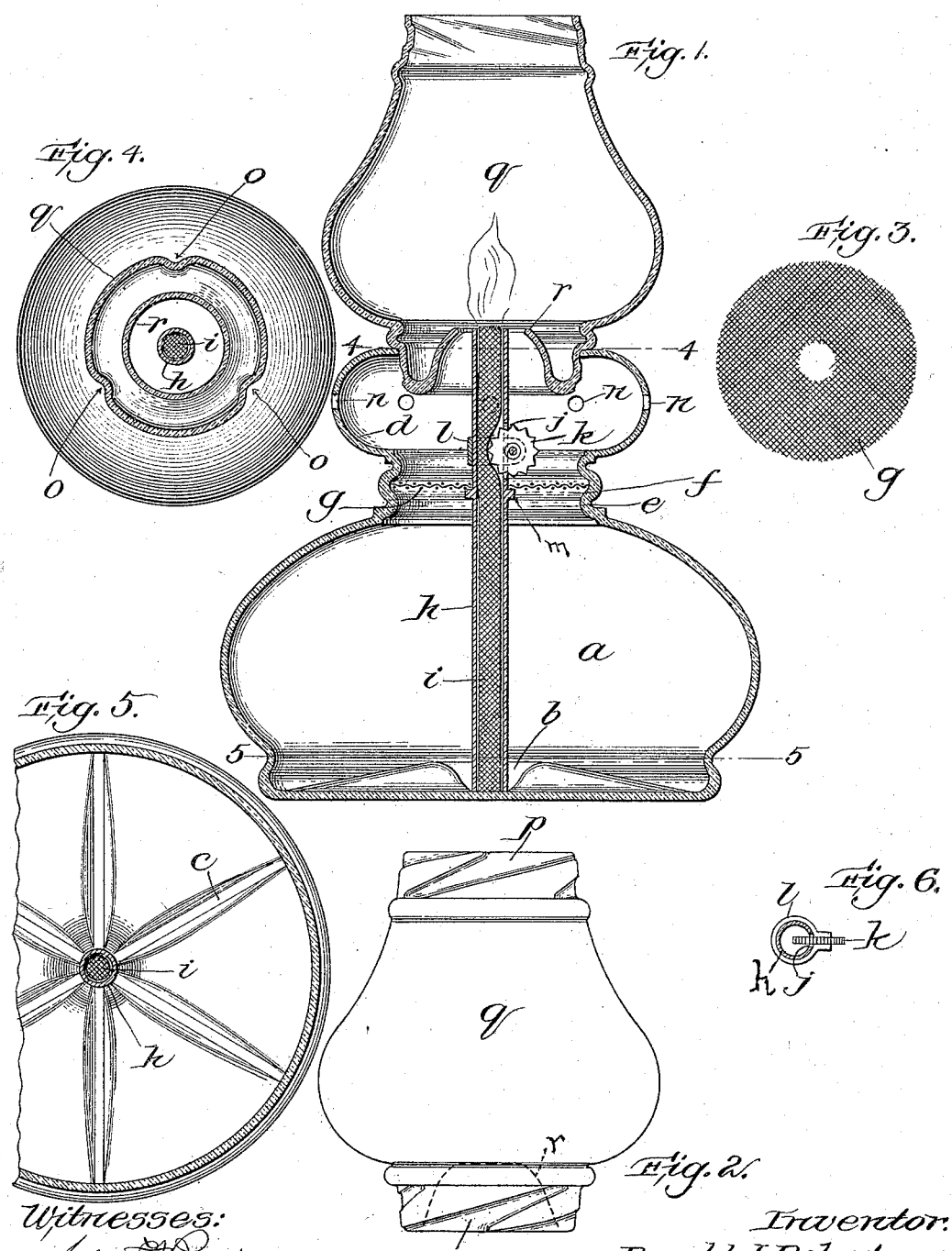

RONALD J. ROBERTSON, OF CHELSEA, MASSACHUSETTS.

LAMP.

SPECIFICATION forming part of Letters Patent No. 640,950, dated January 9, 1900.

Application filed March 27, 1899. Serial No. 710,586. (No model.)

*To all whom it may concern:*

Be it known that I, RONALD J. ROBERTSON, a citizen of the United States, and a resident of Chelsea, in the county of Suffolk and State of Massachusetts, have invented a new and useful Improvement in Lamps, of which the following is a specification, reference being had to the accompanying drawings, in which—

Figure 1 is a central sectional elevation of my new lamp. Fig. 2 is an elevation of the chimney of my new lamp. Fig. 3 is a plan view of the wire-gauze strainer of my new lamp. Fig. 4 is a sectional view on line 4 4 of Fig. 1. Fig. 5 is a sectional view on line 5 5 of Fig. 1. Fig. 6 is a detail top plan view of the toothed wheel which controls the raising and lowering of the wick.

My invention relates to that class of lamps known as "oil-lamps," to which the fuel is supplied in liquid form. In this class of lamps the oil is drawn up from the reservoir through a wick by capillary attraction. Upon reaching the upper end of the wick the oil is subjected to destructive distillation with the formation of marsh-gas, olefiant gas, and the like gases. By the action of heat these gases are decomposed with the separation of solid carbon, the hydrogen combining with the oxygen present. The particles of minutely-divided carbon are heated to incandescence, and it is this incandescent carbon which makes up the light-giving portion of the flame. If a sufficient supply of air is not supplied to the flame, it is red and smoky, for the combustion is not sufficiently energetic to raise the carbon particles to the temperature of incandescence, and much of the carbon passes off in the form of smoke. Again, if the temperature is not high enough much of the oil will pass off in the form of vapor without being subjected to destructive distillation and will thus be wasted. The lamp invented by me and covered by United States Patent No. 545,313 has for its object to save this vapor. In my new lamp the object is to consume all vapor and gas produced. If a large quantity of air be intimately mixed with the gases, little light will be given by the flame, as the carbon will be consumed instantly with the hydrogen. If the air be heated before mixing with the gases, a more energetic combustion will take place and more light will be given out, as all the carbon will be raised to the temperature of incandescence. Hence the quantity of air supplied, the mode and condition in which the air is supplied to the flame, and the manner in which and the point at which the air is concentrated are matters of vital importance in determining the efficiency of the lamp.

One object of my invention is to provide a lamp in which the air-supply shall be under perfect regulation and control, so that a maximum quantity of light may be obtained for a given consumption of oil.

A second object of my invention is to provide a simple means for changing the intensity of the flame without moving the wick.

Another object of my invention is to provide a lamp which shall consist of few parts and which, nearly all these parts being made of glass, shall be cheap in manufacture.

A further object of my invention is to provide a lamp which may be easily and safely carried in the hand.

One feature of my invention is the lamp-chimney, which is of peculiar construction and serves not only to create a draft of air, but also serves to direct the current of air to the most advantageous point and to superheat the air before it comes in contact with the flame. This chimney is reversible end for end and is also vertically adjustable. By reversing the chimney the character of the flame is changed, and the character of the flame is changed also by adjusting the chimney vertically.

Another feature of my invention is the bulbous air-chamber, which serves also as a mouth or funnel for the oil-reservoir and as a means by which to carry the lamp when held between the fingers, this air-chamber being integral with the reservoir and having its side walls pierced for the admission of air.

My invention consists in the lamp-chimney, the lamp, and the combinations hereinafter described and claimed.

In the drawings illustrating the principle of my invention and the best mode now known to me of applying that principle, $a$ is the fount or reservoir of the lamp which holds the oil. In the center of the inner side of the bottom of this fount is formed a depression $b$, which receives the lower end of the wick-tube. The walls of this depression serve to steady the wick-tube and to keep it in place. Leading to the depression $b$ are grooves $c$, which serve to conduct the oil to the depression $b$. The fount $a$ is connected with the air-chamber $d$ by the neck $e$. The fount $a$, air-chamber $d$, and neck $e$ are preferably made integral one with the other and form one piece. A circumferential groove $f$ is formed near the mid-portion of the neck $e$ and on the inside thereof. This groove $f$ receives and holds an annular wire-gauze strainer $g$, which is sprung into place in the groove. The wire-gauze strainer $g$ serves to strain the oil poured into the fount and to prevent grit, burned portions of the wick, and the like from falling into the fount and mixing with the oil. The strainer $g$ also serves to steady the upper end of the wick-tube $h$, which passes through a hole in the center of the strainer $g$. This strainer acts as a safety-piece to prevent the downward passage of the flame. The wick-tube $h$ incloses a wick $i$ and is formed with a slit $j$ to receive a toothed wheel $k$, which engages and serves to raise and lower the wick $i$. The toothed wheel $k$ is journaled in a collar $l$, which is secured to the upper part of the wick-tube $h$. A flange $m$ projects outwardly from the wick-tube $h$ and serves as an additional support for the strainer $g$. The air-chamber $d$ is preferably of the bulbous form shown and is formed with apertures $n$ $n$ for the admission of air to the flame. This air-chamber $d$ serves also as a mouth or funnel through which the oil is poured into the fount and also as a means for grasping and carrying the lamp, the neck $f$ of the lamp being passed between the fingers. The upper inner edge of the air-chamber $d$ is formed with projections $o$, which engage spiral grooves $p$ in the lamp-chimney $q$. The lower portion of the lamp-chimney is curved inwardly and upwardly to form an annular lip $r$, the central hole in which permits the passage of the flame and the upper end of the wick-tube $h$. The shape and curvature given to the walls forming the annular lip $r$ are such as best to direct and to concentrate the flow of air to and upon the flame. The temperature of the air passing over the heated lip $r$ is raised and a more vigorous combustion and a more intense light are thereby obtained. In the exterior of the lower and upper portions of the lamp-chimney $q$ are formed grooves $p$, which are adapted to engage the projections $o$ formed on the inner upper edge of the air-chamber $d$. By means of these grooves and projections the lamp-chimney $q$ is secured in place, and by turning the lamp-chimney it may be adjusted vertically. By this adjustment the relative position of the annular lip $r$ with reference to the upper end of the wick-tube is changed, and the character of the flame is thereby changed as the direction, point of concentration, and supply of the air are changed. The lamp-chimney $q$ is reversible, and this feature furnishes an additional means of varying the character of the flame at will.

My new lamp possesses the following advantages: first, it is made up of few parts; second, with the exception of the wick, toothed wheel, and strainer all parts of my new lamp are preferably made of glass, which prevents creeping of the oil and the consequent accumulation of dirt, and the construction is very cheap; third, the air-supply is controlled so that the character of the flame is under control, with an increase in light and a resulting economy in oil; fourth, the lamp-chimney is positively secured in place and is vertically adjustable and reversible.

What I claim is—

1. As a new article of manufacture, a lamp-chimney having its lower end walls curved inwardly and upwardly and provided with grooves formed in its exterior near the ends thereof for adjusting the position of the end walls with reference to the flame, and thereby controlling the point of concentration of the air-current.

2. As a new article of manufacture, a lamp-chimney having its lower end walls curved upwardly and inwardly to form the annular lip $r$, and provided with means for adjusting the position of said annular lip with reference to the flame, thereby controlling the point of concentration of the air-current.

3. A lamp-base consisting of an oil-reservoir, and an air-chamber surmounting said reservoir, having perforations in its wall, said air-chamber being inturned horizontally at its top for direct engagement with a lamp-chimney held thereby, substantially as shown and described.

4. A lamp-base consisting of an oil-reservoir, an air-chamber surmounting said reservoir, horizontally inturned at its top for holding a lamp-chimney by its inturned edge, projections on said edge, and an intermediate neck portion interiorly grooved, substantially as shown and described.

5. As a new article of manufacture, a lamp-base made up of an oil-reservoir; an annular neck portion formed with an interior circumferential groove for engaging and holding a screen; an air-chamber surmounting said reservoir and connected therewith by said neck portion; said chamber being formed with projections on its upper edge for engaging grooves in the end walls of the chimney.

6. A lamp-base consisting of an oil-reservoir, an air-chamber surmounting said reservoir, having a perforated wall, and an intermediate neck portion having an interior annular groove, said air-chamber being inturned horizontally at its top for direct engagement with a lamp-chimney held thereby, substantially as shown and described.

7. In a lamp, the combination of a vertically-adjustable lamp-chimney having its lower end walls curved inwardly and upwardly; a lamp-base made up of an oil-reservoir and an air-chamber, said reservoir and air-chamber being connected by an annular neck portion; a wick; a wick-tube; a screen located in said annular neck portion, surrounding and supporting said wick-tube and means to raise and lower said wick.

8. In a lamp, the combination of a vertically-adjustable and reversible lamp-chimney having its lower end walls curved inwardly and upwardly; a lamp-base made up of an oil-reservoir and an air-chamber; said reservoir and air-chamber being connected by an annular neck portion formed with an internal circumferential groove; a screen adjusted in place in said groove; a wick; a wick-tube; and means to raise and lower said wick.

9. As a new article of manufacture, a lamp made up of a vertically-adjustable and reversible lamp-chimney having its lower end walls curved inwardly and upwardly; a lamp-base made up of an oil-reservoir and an apertured air-chamber connected to said reservoir by an annular neck portion formed with a circumferential groove; said reservoir being formed with a depression in its base with grooves leading thereto; a screen adjusted in place in said circumferential groove; a wick-tube formed with a flange upon which said screen rests; a wick; and means to raise and lower said wick.

In testimony whereof I have affixed my signature in presence of two witnesses.

RONALD J. ROBERTSON.

Witnesses:
ALEXANDER ROBERTSON,
JAMES HAMILTON.